(12) United States Patent
Majumder et al.

(10) Patent No.: US 7,038,727 B2
(45) Date of Patent: May 2, 2006

(54) METHOD TO SMOOTH PHOTOMETRIC VARIATIONS ACROSS MULTI-PROJECTOR DISPLAYS

(75) Inventors: Aditi Majumder, Woodridge, IL (US); Rick L. Stevens, Naperville, IL (US)

(73) Assignee: The University of Chicago, Chicago, IL (US)

( * ) Notice: Subject to any disclaimer, the term of this patent is extended or adjusted under 35 U.S.C. 154(b) by 525 days.

(21) Appl. No.: 10/283,991

(22) Filed: Oct. 30, 2002

(65) Prior Publication Data

US 2004/0085477 A1    May 6, 2004

(51) Int. Cl.
*H04N 5/66* (2006.01)

(52) U.S. Cl. .................. 348/383; 348/189; 348/745

(58) Field of Classification Search ............ 348/383, 348/189, 744, 745; 345/1.3; 702/69, 81, 702/71, 124; 353/30, 69; 359/443
See application file for complete search history.

(56) References Cited

U.S. PATENT DOCUMENTS

| | | | | |
|---|---|---|---|---|
| 5,136,390 | A | * | 8/1992 | Inova et al. ............. 348/383 |
| 5,396,257 | A | * | 3/1995 | Someya et al. ............ 345/1.1 |
| 6,115,022 | A | * | 9/2000 | Mayer et al. ............. 345/418 |
| 6,219,011 | B1 | * | 4/2001 | Aloni et al. ............. 345/1.3 |
| 6,310,650 | B1 | | 10/2001 | Johnson et al. |
| 6,377,306 | B1 | * | 4/2002 | Johnson et al. ........... 348/383 |
| 6,404,456 | B1 | * | 6/2002 | Smith .................... 348/178 |
| 6,456,339 | B1 | * | 9/2002 | Surati et al. ............ 348/745 |
| 6,570,623 | B1 | * | 5/2003 | Li et al. ................ 348/383 |
| 6,611,241 | B1 | * | 8/2003 | Firester et al. ........... 345/1.3 |
| 6,695,451 | B1 | * | 2/2004 | Yamasaki et al. .......... 353/30 |

\* cited by examiner

*Primary Examiner*—Victor R. Kostak
(74) *Attorney, Agent, or Firm*—Joan Pennington

(57) ABSTRACT

A method is provided to smooth photometric variations across multi-projector displays. Photometric calibration is performed to generate a luminance attenuation map (LAM) for each projector. An image for each projector is modified using the luminance attenuation map (LAM) for each projector to provide image correction in real time. In the photometric calibration step a digital camera is used to measure the color response of the multi-projector display. Using the generated luminance attenuation map (LAM) for each projector for image correction in real time smoothes out distracting color variations across the multi-projector display while maximizing a perceived dynamic range of the display.

16 Claims, 8 Drawing Sheets

METHOD TO SMOOTH PHOTOMETRIC VARIATIONS ACROSS MULTI-PROJECTOR DISPLAYS

CONTRACTUAL ORIGIN OF THE INVENTION

The United States Government has rights in this invention pursuant to Contract No. W-31-109-ENG-38 between the United States Government and Argonne National Laboratory.

RELATED APPLICATION

A related U.S. patent application Ser. No. 10/283,719, entitled "METHODS AND MEASUREMENT ENGINE FOR ALIGNING MULTI-PROJECTOR DISPLAY SYSTEMS" by Mark Hereld, Ivan Judson and Rick Stevens and assigned to the present assignee, is being filed on the same day as the present patent application.

1. Field of the Invention

The present invention relates to a method to smooth photometric variations across multi-projector displays.

2. Description of the Related Art

Tiled projection display systems use multiple projectors to produce a large, high-resolution image. In many known systems, multiple screens are placed next to each other to form a large image display. A difficulty with many of the multi-projector display systems is that the multiple images often do not appear as one single continuous image on the display screen. When multiple images are projected on a single screen, typically the composite image includes alignment errors and optical distortions. In the composite image, often there are seams or bright lines between the multiple images.

Large-area displays made up of several projectors show significant spatial variation in color, both within a single projector's field of view and also across different projectors. Color variation is primarily due to luminance variation. Luminance varies within a single projector's field of view, across different brands of projectors and with the variation in projector parameters. Luminance variation is also introduced by overlap between adjacent projectors.

Color can be specified by three parameters (Y, x, y). The parameter Y is called the luminance and can be thought of as the amount of achromatic light present in a color. The parameters (x, y) are called chromaticity coordinates and together define the chrominance. When two colors c1=(Y1, x1, y1) and c2=(Y2, x2, y2) are combined additively in proportions p1 and p2 (as the primaries are combined in display systems) to give a third color c3=(Y3, x3, y3), such that p1+p2=1, then:

$$Y3=Y1+Y2;\ x3=p1x1+p2x2;\ y3=p1y1+p2y2$$

The three colors red, green, blue (R,G,B) used to create a display are called primaries, and the independent input paths for these primaries are called channels. The input for each primary has a range from 0.0 to 1.0. The colors projected by the display for the input of 1.0 at each channel (and 0.0 in other two channels) are (YR, xR, yR), (YG, xG, yG) and (YB, xB, yB) respectively. The triangle formed by the chromaticity coordinates of these primaries is called the color gamut of the display.

Ideally, it is desirable to have a display where given the properties of the primaries one can predict, using simple formulae, the properties of any color produced by the combination of the primaries. This becomes easy if the display satisfies the following properties.

1. Channel Independence: This assumes that the light projected from one channel is independent of the other two. Hence, this assumes that there is no leakage light from other channels to interfere with the light projected from a channel.

2. Channel Constancy: This assumes that for each channel, with changing inputs only luminance changes while the chromaticity coordinates remain constant. This means that for input $0.0 \leq r \leq 1.0$, xr=xR and yr=yR and Yr changes, where (xr, yr) is the chromaticity coordinate of r and Yr is the luminance of r.

3. Spatial Homogeneity: The response of all the pixels of the display device is identical for any given input.

4. Temporal Stability: The response for any input at any pixel of the device does not change with time.

The property of optical superposition states that light falling at the same physical location from different sources adds up. The properties of channel constancy, channel independence, optical superposition along with the assumption that with an input of (0, 0, 0) the display outputs zero light indicates that the color projected at a pixel is a linear combination of the color projected by the maximum values of the red, green, and blue channels alone when the values of the other two channels are set to zero. Hence, for any input c=(r, g, b), $0.0 \leq r, g, b \leq 1.0$, the luminance Yc is given by Yr+Yg+Yb and the chromaticity coordinate is given by the barycentric coordinate:

$$xc=rxR+gxG+bxB;\ yc=ryR+gyG+byB$$

This is referred to as the linear combination property.

Given the linear combination, the spatial homogeneity, and the temporal stability property, it is easy to predict the color properties of any pixel of the display surface for any input if the response of the primaries at any one pixel of the display is known. Most traditional display devices, such as cathode ray tube (CRT) monitors satisfy these properties to a reasonable accuracy or the deviation from this ideal behavior is simple enough to be accuracy or the deviation from this ideal behavior is simple enough to be modeled by simple linear mathematical functions. However, a projector is not such an ideal device.

U.S. Pat. No. 6,310,650 issued Oct. 30, 2001 discloses a method for calibrating a tiled display system. One or more cameras are provided to capture an image of the display screen. The resulting captured image is processed to identify any non-desirable characteristics, including visible artifacts such as, seams, bands, and rings. Then an appropriate transformation function is determined. The transformation function is used to pre-warp the input video signal that is provided to the display such that the non-desirable characteristics are reduced or eliminated from the display. The transformation function preferably compensates for spatial non-uniformity, color non-uniformity, luminance non-uniformity, and other visible artifacts.

U.S. Pat. No. 6,377,306 issued Apr. 23, 2002 discloses a display for producing a seamless composite image from at least two discrete images. The display includes one or more projectors for projecting each of the discrete images separately onto a screen such that at least one of the discrete images overlaps at least one other of the discrete images by more than 25 percent. The amount of overlap that is required to reduce the seams of the composite image to an acceptable level over a predetermined viewing angle depends on a number of factors including the field-of-view and aperture size of the projectors, and the screen gain profile. For rear-projection screens and some front projection screens, an overlap of more than 25 percent is acceptable.

A principal object of the present invention is to provide an improved method to smooth photometric variations across multi-projector displays.

Another object of the present invention is to provide such method to smooth photometric variations across multi-projector displays that is effective and that is generally simple to implement.

Other important objects of the present invention are to provide such method to smooth photometric variations across multi-projector displays substantially without negative effect; and that overcome some disadvantages of prior art arrangements.

SUMMARY OF THE INVENTION

In brief, a method is provided to smooth photometric variations across multi-projector displays. Photometric calibration is performed to generate a luminance attenuation map (LAM) for each projector. An image for each projector is modified using the luminance attenuation map (LAM) for each projector to provide image correction in real time.

In accordance with features of the invention, in the photometric calibration step a digital camera is used to measure the color response of the multi-projector display. Using the generated luminance attenuation map (LAM) for each projector for image correction in real time smoothes out distracting color variations across the multi-projector display while maximizing a perceived dynamic range of the display. Initial calibration operations include a camera calibration procedure to generate a non-linearity response map for a camera; a projector calibration procedure to reconstruct for each projector a non-linearity function and generate a projector linearity map that makes this response linear; and a geometric calibration procedure to generate maps represented by Pi→C, C→M, and Pi→M, where Pi denotes projector i, C denotes camera, and M denotes mural or the composite multi-projector display.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
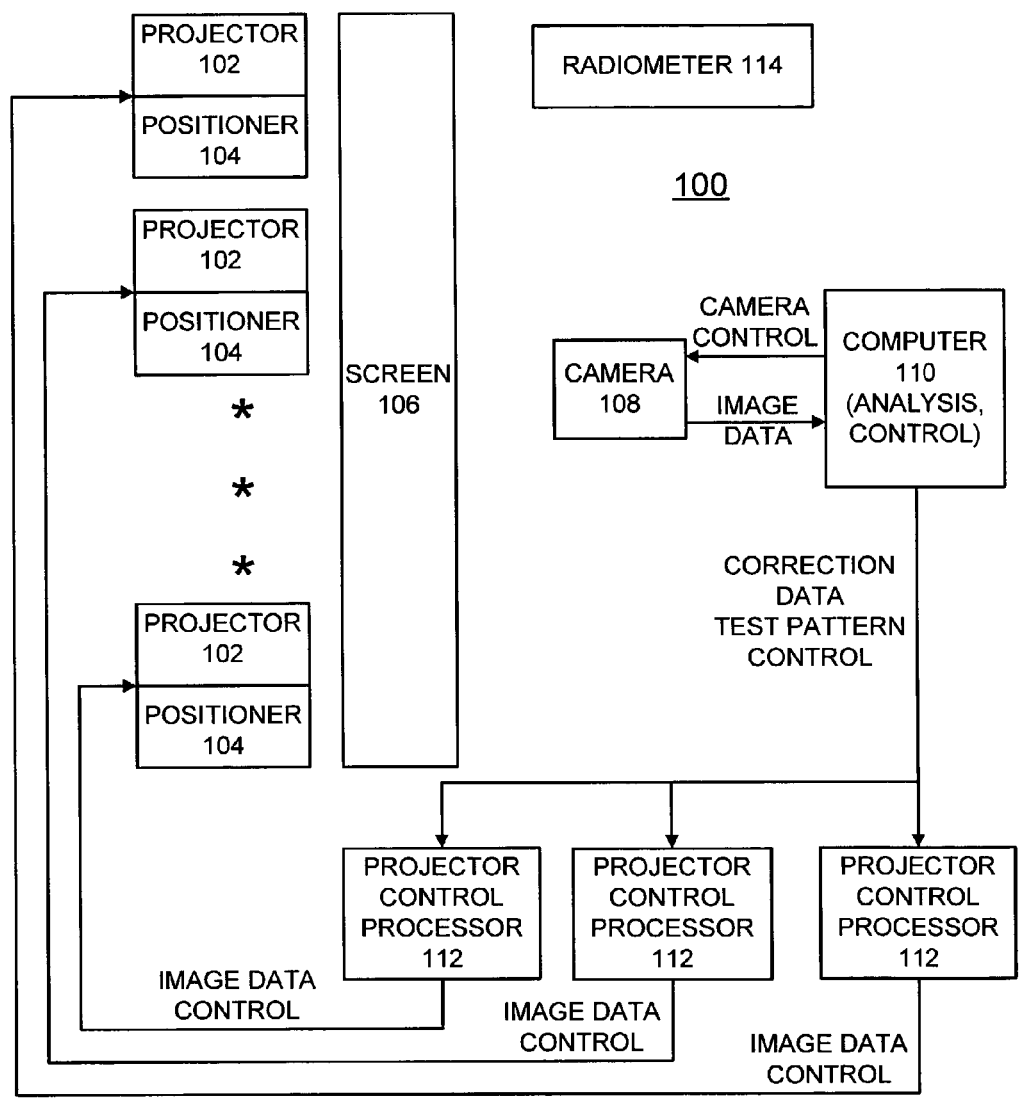
FIG. 1 is a block diagram representation illustrating a multi-projector display system for implementing the novel method to smooth photometric variations across multi-projector displays in accordance with the preferred embodiment; and steps of the method to smooth photometric variations across multi-projector displays in accordance with the preferred embodiment.

Having reference now to the drawings, in FIG. 1 there is shown a multi-projector display system generally designated by the reference character 100 for implementing the novel method to smooth photometric variations across multi-projector displays in accordance with the preferred embodiment. Multi-projector display system 100 includes a plurality of projectors 102, each having an associated positioner 104, for projecting large area, high resolution tiled displays onto a display screen 106. Multi-projector display system 100 includes an array of multiple projectors 102, for example, a 3×5 array of 15 projectors 102. Multi-projector display system 100 includes a camera 108 for capturing tiled display images and applying image data to a computer 110 for analysis and implementing the method to smooth photometric variations across multi-projector displays in accordance with the preferred embodiment. Computer 110 optionally operatively controls camera 108 as indicated at a line labeled camera control. Computer 110 applies correction data, test pattern and control to each of a plurality of projector control processors 112. Projector control processors 112 apply image data and control signals to the projectors 102 and associated positioners 104. A radiometer 114 is used to measure a per channel non-linear luminance response of each projector.

It should be understood that the present invention is not limited to the illustrated multi-projector display system 100. For example, a single server computer could be used instead of the plurality of projector control processors 112. Rather than using separate projector control processors 112, the respective projectors 102 could be provided with an integral control processor.

Various commercially available digital cameras can be used for camera 108, for example, a Fujifilm MX-2900 Zoom (1800×1200). Various commercially available computers can be used for computer 110, for example, a personal computer or laptop computer. Computer 110 is suitably programmed to execute the flowcharts of FIGS. 2, 3, 4, 5, 6, 7, and 8 for implementing the novel methods to smooth photometric variations across multi-projector displays in accordance with the preferred embodiment. Various commercially available devices can be used for radiometer 114, such as, a model PR-715 SpectraScan spectroradiometer, manufactured and sold by Photo Research Inc. of Chatsworth, Calif.

In accordance with features of the invention, a photometric variation smoothing method includes a calibration procedure when a luminance attenuation map (LAM) is generated. This LAM is then used to correct any image to achieve photometric uniformity. In the calibration step, a camera is used to measure a per channel luminance response of a multi-projector display and find the pixel with the most limited luminance response. Then for each projector, a per channel LAM is generated that assigns a weight to every pixel of the projector to scale the luminance response of that pixel to match the most limited response. The LAM for each projector is then used to attenuate any image projected by each projector. Image correction in real time on traditional graphics pipeline is performed using alpha blending and color look-up-tables. The LAM for each projector is implemented using the conventional graphics pipeline in real time by alpha blending. Matching luminance across all the pixels of a multi-projector display is a novel feature of the present invention. Experimental results show that luminance matching can indeed achieve photometric uniformity.

The method of the invention substantially matches the luminance at every pixel of a multi-projector display with each other. Within a single projector's field of view, only luminance varies while chrominance remains almost constant. Across different projectors of same brand, chrominance variation is negligible while luminance variation is significant. Chrominance varies some across projectors of different brand, but this variation is very small when compared to the variation in luminance. With the change in various projector parameters such as brightness, contrast, zoom, distance and orientation, only luminance changes while chrominance remains constant. Thus, the key observation is that for every channel, luminance undergoes significant variation while chrominance and the color gamut does not vary much. Further typically multi-projector displays include projectors of the same brand. In addition to this, from a perceptual standpoint, the humans are more sensitive to luminance changes than to chrominance changes.

Figure 2:
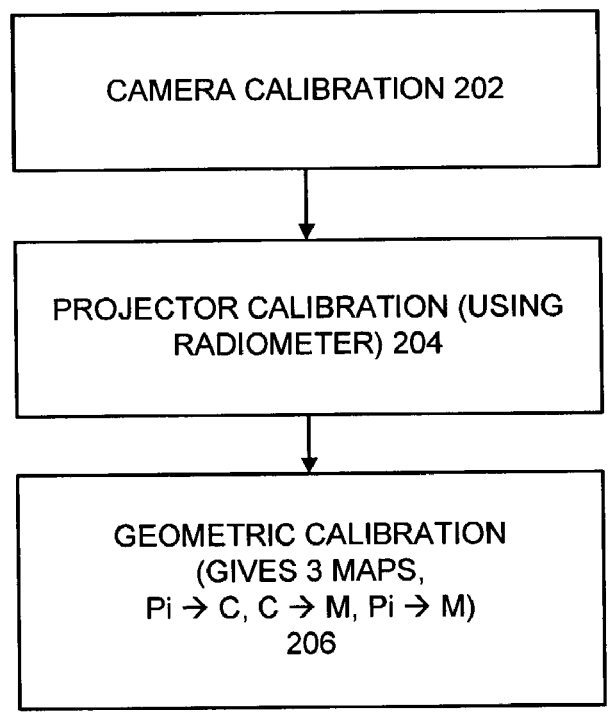

Referring now to FIG. 2, there are shown exemplary steps of initial calibration operations in accordance with the method to smooth photometric variations across multi-projector displays of the preferred embodiment. As indicated in a block 202, camera calibration is performed. Camera calibration is illustrated and described with respect to FIG. 4. Each projector 102 is calibrated, for example, using the radiometer 114 as indicated in a block 204, as illustrated and described with respect to FIG. 5. A geometric calibration is performed as indicated in a block 206, as illustrated and described with respect to FIG. 6. At block 206, the geometric calibration provides 3 maps indicated as Pi→C, C→M, and Pi→M, where Pi denotes projector i, C denotes camera, and M denotes mural or the composite multi-projector display.

Figure 3:
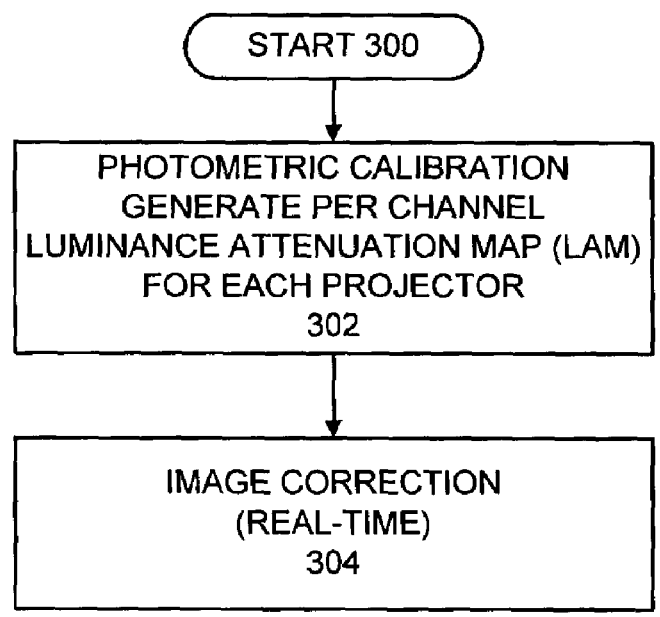

Referring now to FIG. 3, there are shown exemplary steps of the method to smooth photometric variations across multi-projector displays of the preferred embodiment. First a photometric calibration is performed and a per channel luminance attenuation map (LAM) is generated for each projector 102 as indicated in a block 302. The photometric calibration is a one-time calibration procedure, or is periodically performed procedure, as illustrated and described with respect to FIG. 7. Camera 108 is used for measuring the luminance or chrominance at a high spatial resolution. To extract the luminance or chrominance from camera color data, standard linear RGB to YUV transformation is used. Using alpha blending and color look-up-tables (LUTs), for example, image correction in real time on a traditional graphics pipeline is performed as indicated in a block 304. The procedure for image correction in real time is illustrated and described with respect to FIG. 8.

Figure 4:
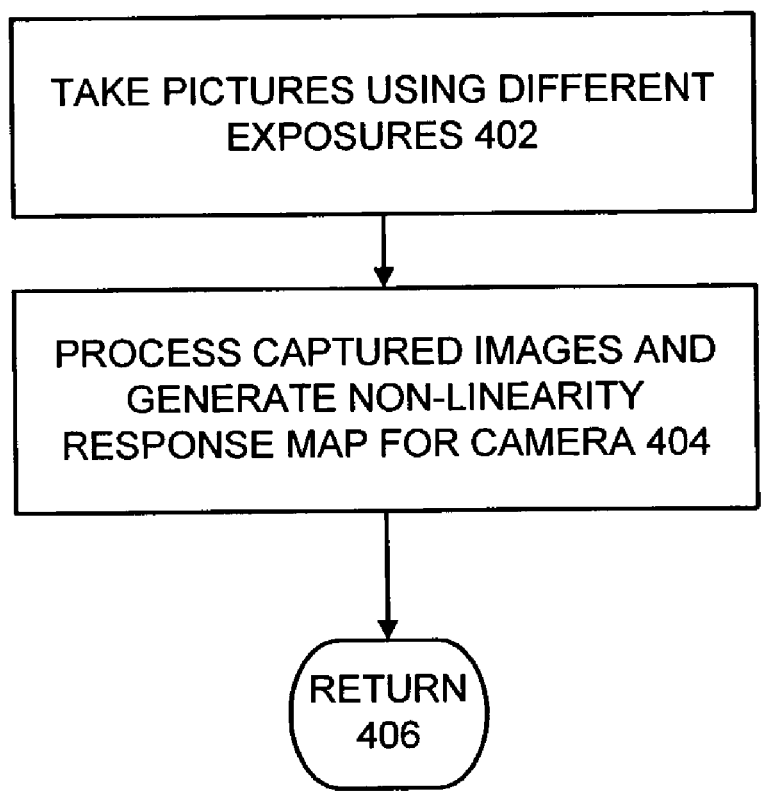

Referring now to FIG. 4, the camera calibration procedure starts with taking pictures using different exposures as indicated in a block 402. Then the captured images are processed to generate a non-linearity response map for the camera 108 as indicated in a block 404. The generated non-linearity response map for the camera 108 is, for example, stored as a color look-up-table that linearizes the camera response. In use, each picture from the camera 108 is linearized using this color look-up-table (LUT). Then the operations return as indicated in a block 406.

Figure 5:
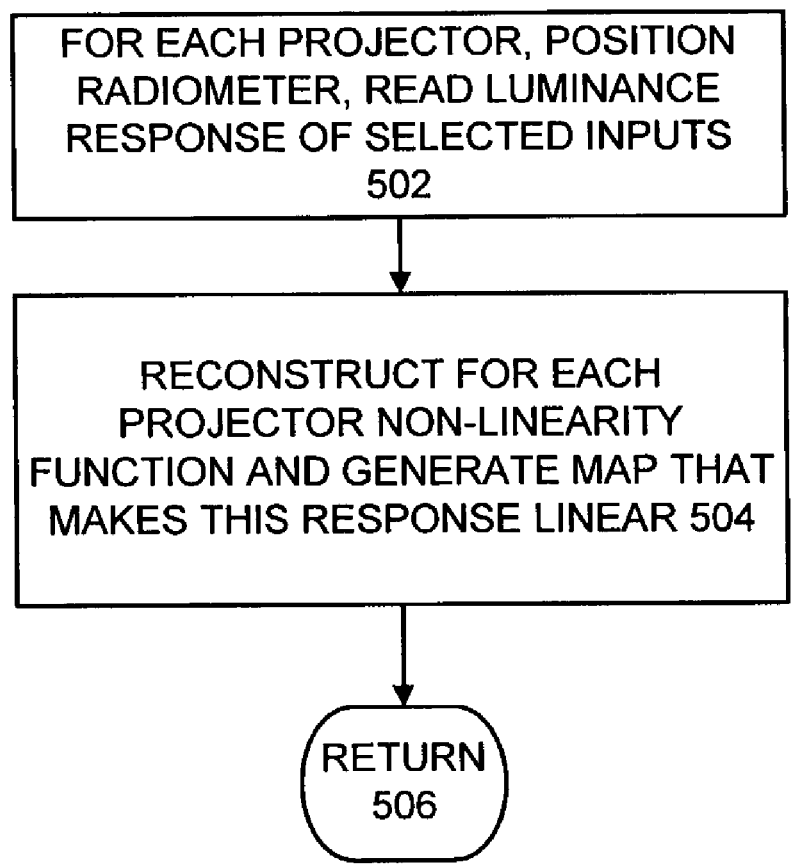

Referring now to FIG. 5, the projector calibration procedure includes for each projector 102, positioning radiometer 114 generally centrally proximate for each projected tile and reading luminance response of selected inputs as indicated in a block 502. For example, photometer 114 is used to measure the per channel non-linear luminance response only at the center of every projector 102. Then a non-linearity function is reconstructed for each projector and a projector calibration map or look-up-table is generated that makes this response linear as indicated in a block 504. Then the operations return as indicated in a block 506.

Figure 6:
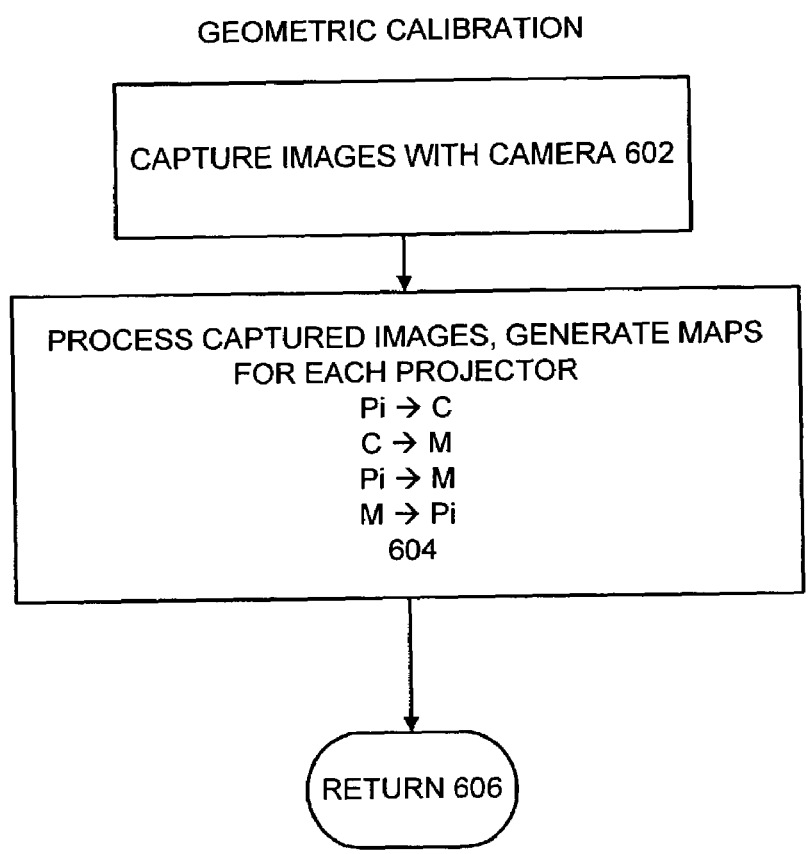

Referring now to FIG. 6, the geometric calibration procedure starts with capturing images with the camera 108 as indicated in a block 602. Then the captured images are processed to generate maps Pi→C, C→M, Pi→M, and M→Pi for each projector 102 as indicated in a block 604. At block 604, the generated maps respectively define the geometric relationships between the projector pixels (xPi, yPi), camera pixels, (xc, yc), and the mural or display pixels (xd, yd). Then the operations return as indicated in a block 606.

The above-identified related United States patent application entitled "METHODS AND MEASUREMENT ENGINE FOR ALIGNING MULTI-PROJECTOR DISPLAY SYSTEMS" by Mark Hereld, Ivan Judson and Rick Stevens discloses methods advantageously used in the geometric calibration procedure of FIG. 6. The subject matter of the above-identified United States patent application is incorporated herein by reference.

Figure 7:
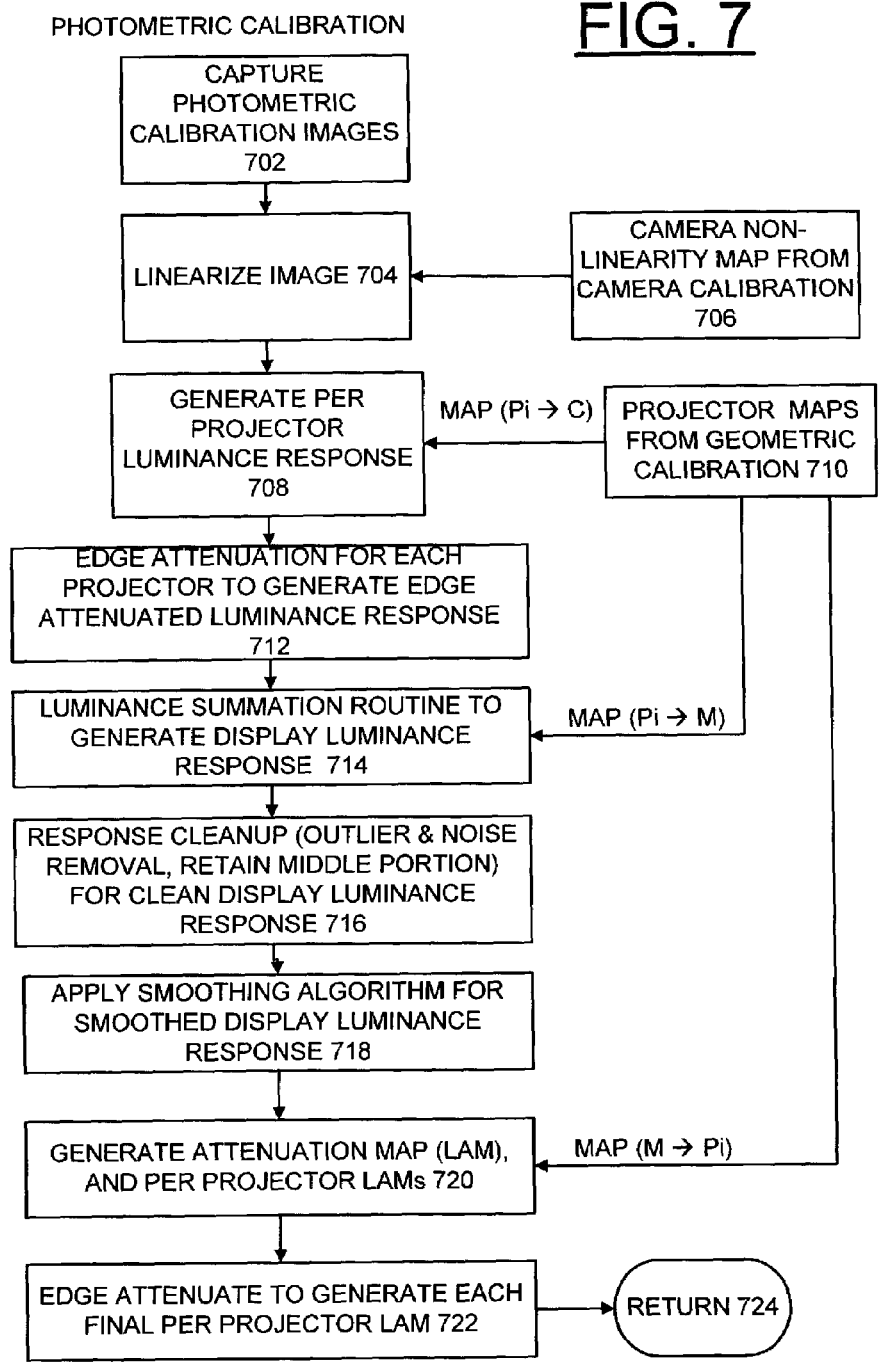

Referring now to FIG. 7, the photometric calibration procedure starts with capturing photometric calibration images with the camera 108 as indicated in a block 702. Images are captured for every projector Pi when the projector Pi is projecting a maximum input for each channel. During this time, all the projectors that overlap with projector Pi are turned off to capture the luminance contribution solely from projector Pi accurately. To capture the data for all projectors in the display, a total of, for example, four pictures per channel are taken. In each picture alternate projectors are turned on so that none of them overlap with each other. Then the captured images are linearized as indicated in a block 704 using the camera non-linearity map from the camera calibration procedure of FIG. 4 as indicated in a block 706.

As indicated in a block 708, the linearized captured images of predefined static patterns projected on the display are processed to generate per projector luminance response using the map (Pi→C) from the geometric calibration as indicated in a block 710. The luminance surface in the camera coordinate space is found corresponding to the generated linearized images. A standard linear transformation is used to convert RGB colors to YUV space given by: $Y=0.299R+0.587G+0.114B$. Generating the per projector luminance surface includes generating $L_{Pi}$ for each projector Pi. For every pixel of the projector, the corresponding camera coordinate is found using map Pi→C and then interpolate bilinearly the corresponding luminance from the luminance of the four nearest neighbors in the camera coordinate space.

Edge attenuation is performed for each projector 102 to generate an edge attenuated luminance response as indicated in a block 712. In most multi-projector displays, adjacent projectors are overlapped to avoid rigid geometric alignment. The luminance in the overlap region is much higher than the luminance in the non-overlapped region and this spatial transition is very sharp. By attenuating a few pixels at the edge of each projector, this sharp transition is smoothed out. This increases the error tolerance to inaccuracies in reconstruction of the luminance surface in regions of sharp transition. After generating the luminance image for each projector, for example, 40–50 pixels at the edge of the projector are attenuated using a linear function. Similarly, a different function, for example, a cosine ramp can be used. Information about the exact location of the overlap regions is not needed for this purpose, only that the attenuation width is less than the width of the overlap. This approach allows processing the luminance of each projector independently, without considering geometric correspondences across the projectors.

A luminance summation routine is performed using the map (Pi→M) from the geometric calibration at block 710 to generate a display luminance response as indicated in a block 714. Having the luminance image for each projector, the luminance images for each projector are added in the display coordinate space to generate $L_d$. For every projector pixel, the map Pi→M to find the corresponding display coordinate and then the contribution of luminance to the nearest four display pixels is added in a bilinear fashion.

A response cleanup routine is performed, for example, for outlier and noise removal and to retain a middle portion to generate a clean display luminance response as indicated in a block 716. Next a smoothing algorithm is applied to generate a smoothed display luminance response as indicated in a block 718. The common achievable response is defined as the minimum $L_d$ designated by $L_{min}$. A luminance attenuation map $L_d$ is generated in the display coordinate space by dividing $L_{min}$ by $L_d$. A luminance attenuation map (LAM) is dimmer to compensate for the brighter regions of the luminance surface in the overlap regions and near the center of each projector. Because of the large luminance fall-off at the edges of the boundary projectors where there is no overlap, the reduction in dynamic range can be drastic leading to unacceptable picture quality. Hence, about 200 pixels in the boundary of the display coordinate system are ignored while generating the LAM.

Using the map (M→Pi) from the geometric calibration at block 710, an attenuation map (LAM) is generated from the smoothed display luminance response in the display coordinate space and per projector LAMs are generated as indicated in a block 720. To generate the per projector attenuation map $A_{Pi}$, for every projector pixel, the map Pi→M is used to convert each projector pixed to the corresponding display coordinate and then interpolate bilinearly the corresponding luminance $A_d$ from the luminance of the four nearest neighbors in the display coordinate space.

Then the per projector LAMs are edge attenuated to generate each final per projector LAM as indicated in a block 722. Edge attenuation is put into the LAM for each projector at block 722 by attenuating the same number of edge pixels in the same way as was done while generating the luminance image in block 712. Then the sequential operations return as indicated in a block 724.

Figure 8:
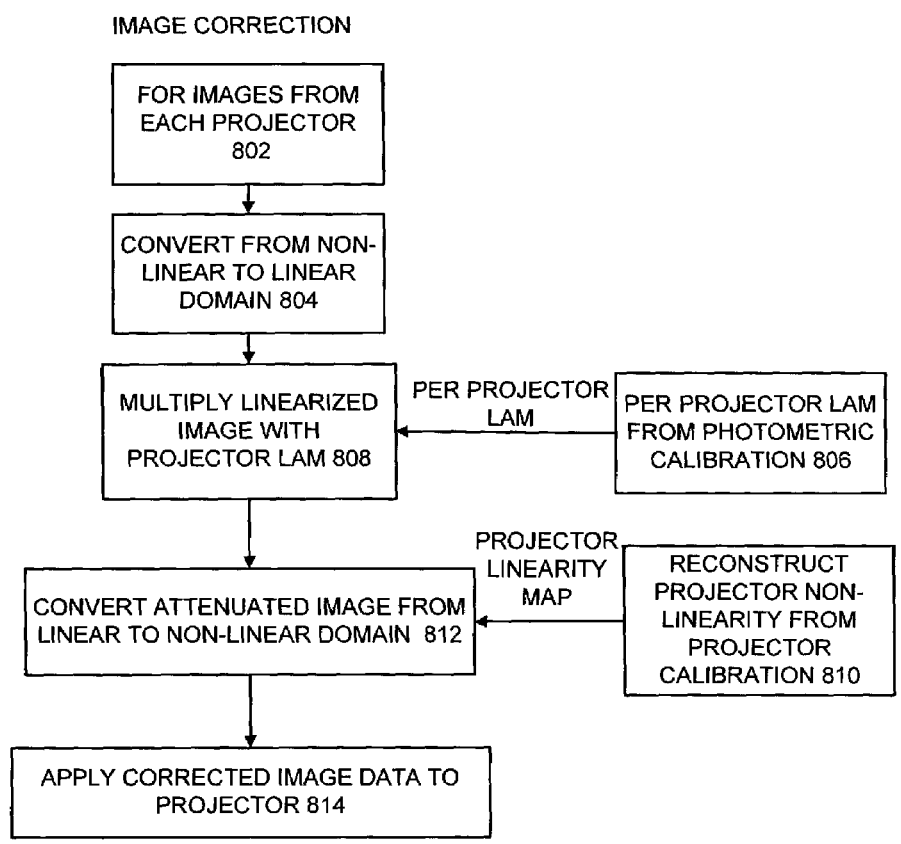

Referring now to FIG. 8, there are shown exemplary steps of the procedure for image correction in real time. For images from each projector as indicated in a block 802, the image data is converted from non-linear to the linear domain as indicated in a block 804. The converted linear domain image data or linearized image from each projector is multiplied with the projector LAM using the per projector LAM from the photometric calibration as indicated in a block 806 as indicated in a block 808. The LAM for each projector can be used as an alpha mask that is blended with the rendered image.

Using the projector linearity map from the reconstruct projector non-linearity from projector calibration as indicated in a block 810, the attenuated image is converted from the linear to non-linear domain as indicated in a block 812. The converted non-linear output of block 812 is applied for each projector as indicated in a block 814.

While the present invention has been described with reference to the details of the embodiments of the invention shown in the drawing, these details are not intended to limit the scope of the invention as claimed in the appended claims.

What is claimed is:

1. A method to smooth photometric variations across multi-projector displays comprising the steps of:
    performing photometric calibration to generate a luminance attenuation map (LAM) for each projector including capturing photometric calibration images using a digital camera;
    modifying an image for each projector using said luminance attenuation map (LAM) for each projector to provide image correction in real time;
    performing an initial camera calibration procedure to generate a camera non-linearity response map;
    using said camera non-linearity response map and linearizing said captured photometric calibration images; and
    performing an initial geometric calibration procedure to generate geometric calibration maps represented by Pi→C, C→M, Pi→M, and M→Pi, where Pi denotes projector i, C denotes camera, and M denotes mural for the composite multi-projector display.

2. A method to smooth photometric variations across multi-projector displays as recited in claim 1 includes utilizing said geometric calibration map (Pi→C) to generate a per projector luminance response.

3. A method to smooth photometric variations across multi-projector displays as recited in claim 2 includes performing edge attenuation of said per projector luminance response to generate an edge attenuated luminance response for each projector.

4. A method to smooth photometric variations across multi-projector displays as recited in claim 3 includes utilizing said geometric calibration map (Pi→M), performing a luminance summation routine to generate a display luminance response.

5. A method to smooth photometric variations across multi-projector displays as recited in claim 4 includes performing a response cleanup routine of said display luminance response for outlier and noise removal and to retain a middle portion of said display luminance response to generate a clean display luminance response.

6. A method to smooth photometric variations across multi-projector displays as recited in claim 5 includes applying a smoothing algorithm to said clean display luminance response to generate a smoothed display luminance response.

7. A method to smooth photometric variations across multi-projector displays as recited in claim 6 includes utilizing said geometric calibration map (M→Pi), processing said smoothed display luminance response to generate a luminance attenuation map (LAM) and an initial luminance attenuation map (LAM) for each projector.

8. A method to smooth photometric variations across multi-projector displays as recited in claim 7 includes edge attenuating said initial luminance attenuation map (LAM) for each projector to generate said luminance attenuation map (LAM) for each projector.

9. A method to smooth photometric variations across multi-projector displays as recited in claim 1 wherein the step of modifying an image for each projector using said luminance attenuation map (LAM) for each projector to provide image correction in real time includes the steps for images from each projector, converting image data from non-linear domain to a linear domain.

10. A method to smooth photometric variations across multi-projector displays as recited in claim 9 includes multiplying said converted linear domain image data for each projector with said luminance attenuation map (LAM) for each projector to generate attenuated linear domain image data for each projector.

11. A method to smooth photometric variations across multi-projector displays as recited in claim 10 includes performing an initial projector calibration procedure to reconstruct for each projector a non-linearity function and generate a projector linearity map for each projector.

12. A method to smooth photometric variations across multi-projector displays as recited in claim 11 includes using said projector linearity map for each projector, converting said attenuated linear domain image data for each projector to attenuated non-linear domain image data for each projector.

13. A method to smooth photometric variations across multi-projector displays as recited in claim 12 includes applying said attenuated non-linear domain image data for each projector to the projectors.

14. A method to smooth photometric variations across multi-projector displays comprising the steps of:
   performing an initial camera calibration procedure to generate a camera non-linearity response map;
   performing an initial projector calibration procedure to reconstruct for each projector a non-linearity function and generate a projector linearity map for each projector;
   performing an initial geometric calibration procedure to generate geometric calibration maps represented by Pi→C, C→M, Pi→M, and M→Pi, where Pi denotes projector i, C denotes camera, and M denotes mural for the composite multi-projector display;
   using said camera non-linearity response map and said geometric calibration maps, performing photometric calibration to generate a luminance attenuation map (LAM) for each projector; and
   modifying an image for each projector using said luminance attenuation map (LAM) for each projector and said projector linearity map for each projector to provide image correction in real time.

15. A method to smooth photometric variations across multi-projector displays as recited in claim 14 wherein the step of performing photometric calibration to generate said luminance attenuation map (LAM) for each projector includes capturing photometric calibration images using a digital camera.

16. A method to smooth photometric variations across multi-projector displays as recitad in claim 14 wherein the depot modifying said image for each projector using said luminance attenuation map (LAM) for each projector includes multiplying said luminance attenuation map (LAM) for each projector with said image for each projector.

* * * * *